United States Patent
Inoue

(10) Patent No.: US 6,493,462 B1
(45) Date of Patent: Dec. 10, 2002

(54) IMAGE PROCESSING APPARATUS

(75) Inventor: Shinji Inoue, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/417,429

(22) Filed: Oct. 13, 1999

(30) Foreign Application Priority Data

Oct. 21, 1998 (JP) ............................................ 10-299229

(51) Int. Cl.[7] ............................. G06K 9/00; H04N 1/46; H04N 1/40; G06T 7/00
(52) U.S. Cl. ......................... 382/170; 382/168; 358/522
(58) Field of Search ................................. 358/500, 518, 358/522, 530, 531; 382/162, 168, 170

(56) References Cited

U.S. PATENT DOCUMENTS

| | | | | | |
|---|---|---|---|---|---|
| 5,129,645 A | * | 7/1992 | Hamakawa | .................. | 271/241 |
| 5,592,305 A | * | 1/1997 | Iwadate | ...................... | 358/448 |
| 5,784,483 A | * | 7/1998 | Takaragi | ..................... | 382/135 |
| 5,877,864 A | * | 3/1999 | Sumida | ...................... | 345/115 |
| 6,070,212 A | * | 5/2000 | Yasuda | ........................ | 710/107 |

FOREIGN PATENT DOCUMENTS

| | | | | | |
|---|---|---|---|---|---|
| JP | 05075842 | * | 3/1993 | .......... | H04N/1/393 |
| JP | 7-131636 | | 5/1995 | ............ | H04N/1/40 |
| JP | 10188197 A | * | 7/1998 | ........... | G06F/17/60 |
| JP | 02000/34466 A | * | 5/2000 | ............ | H04N/1/40 |

* cited by examiner

*Primary Examiner*—Jerome Grant, II
(74) *Attorney, Agent, or Firm*—Hogan & Hartson, LLP

(57) ABSTRACT

An image processing device determines whether or not a scanned image is copy-prohibited based on comparisons between a histogram of the brightness of the pre-stored copy-prohibited material such as paper currency and a histogram of the scanned image, and/or between the size of the copy-prohibited material and the size of the scanned image. A document is scanned by a scanning unit, and the brightness histogram of the scanned image is generated by a histogram generating unit. This histogram is then used by a copy-prohibited determining unit to determine whether or not to prohibit copying.

18 Claims, 4 Drawing Sheets

IMAGE PROCESSING APPARATUS

BACKGROUND OF THE INVENTION

1. Field of the Invention

The present invention relates to a technology that can be employed in an image processing machine such as color copier, which is designed to scan an original document or paper and print a duplicate image on a recording sheet, for preventing the forgery and counterfeiting of paper currency or other monetary instruments.

2. Description of the Related Art

With the spread of advanced digital color copying technology and copying machines incorporating such technology, the forgery and production of counterfeit paper currency, stock certificates, bearer bonds, and other monetary instruments has become a problem. In order to prevent such forgery, image processing devices equipped with anti-counterfeiting capability have been developed. Such devices contain pre-stored image data representing images of items for which copying is prohibited. When a user attempts to copy an original item, the image data that is scanned-in is compared against the pre-stored image data using pattern-matching techniques, and when the scanned image data matches the pre-stored image data, image formation on the copying sheet is prohibited. Alternatively, copying may be prohibited by having an entirely black image printed out onto the copy sheet.

One problem with such conventional systems, however, is that a large amount of memory is required to store the images of the various forms of currency and certificates in order to prevent them from being copied. Additionally, accounting for possible slanting or awkward angles of the original material in the scanned image data makes the comparison procedure performed by the image processing device very complicated.

SUMMARY OF THE INVENTION

It is thus an object of the present invention to provide an image processing device and method which determine whether or not items being copied are copy-prohibited items based on a histogram of the brightness levels of the copy-prohibited image and/or based on the size (area) of the copy-prohibited image as calculated from said histogram, thereby requiring less memory and a simpler procedure in determining whether or not scanned items are copy-prohibited.

In order to accomplish this object, according to one aspect of the present invention, an image processing apparatus includes a scanning unit for scanning an original item, a histogram generating unit for generating a first histogram of signal (first color histogram) from image signals scanned in by the scanning unit, and a copy-prohibited determining unit for determining based on the first histogram whether or not the item being copied is copy-prohibited. With such an image processing apparatus, the process for determining whether or not copying should be prohibited is simplified.

The copy-prohibited determining unit may include an area calculating unit for calculating the area (first area of the scanned original item based on the first histogram, a storage unit for pre-storing RGB signal histograms (a group of second histograms of copy-prohibited materials such as paper currency, stock certificates, bearer bonds and the like and the sizes (a group of second areas of these copy-prohibited materials, and a comparing unit for comparing each of the second histograms together with the size of the corresponding copy-prohibited material with the first histogram together with the size of the scanned item.

The copy-prohibited determining unit may determine that copying should be prohibited when both the first histogram and first area match any of the second histograms and the size of the corresponding copy-prohibited material. With such a copy-prohibited determining unit, the determination of whether or not copying should be prohibited can be made precisely.

DETAILED DESCRIPTION OF THE INVENTION

An embodiment of the present invention will now be described with reference to the accompanying drawings.

Figure 1:
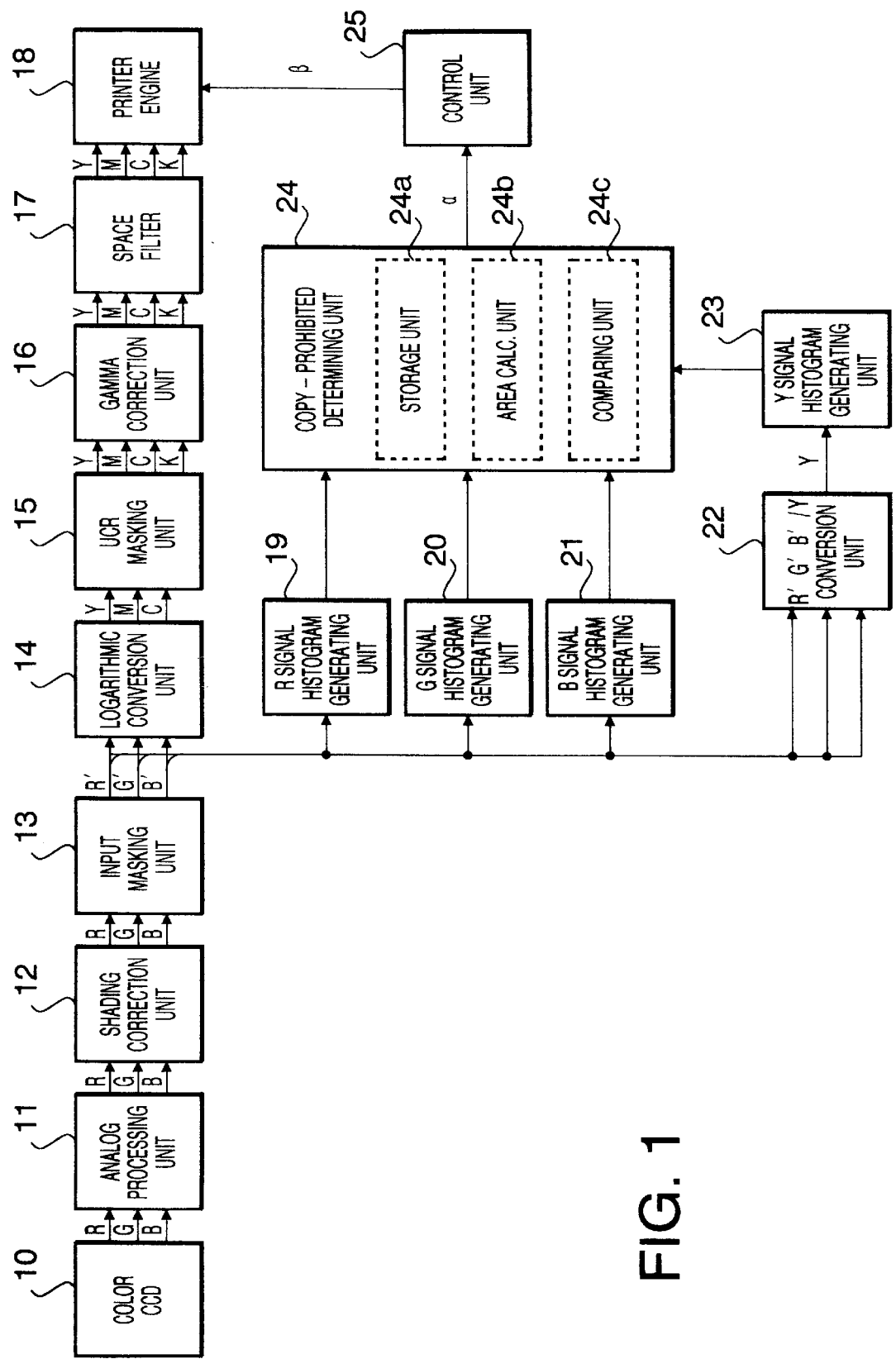
FIG. 1 is a block diagram showing an image processing device according to the present invention.

Referring to FIG. 1, illustrated is a digital color image processing device provided with a function for prohibiting the copying of certain documents. In this diagram, a color CCD (Charge Coupled Device 10 separates the image of a scanned document into R, G, and B (Red, Green, and Blue signals, and passes these signals to an analog processing unit 11. The analog processing unit 11 includes an 8-bit analog-to-digital converter (A/D converter. It converts the RGB signals into digital signals and sends the digital signals to a shading correction unit 12. At the shading correction unit 12, variations in shading in the main scanning direction are corrected and then the signals are passed to an input masking unit 13.

The RGB signals are then masked (color adjusted at the masking unit 13 and the resulting R'G'B' signals are passed to a logarithmic conversion unit 14. At the logarithmic conversion unit 14, the R'G'B' signals are converted to CMY color (Cyan, Magenta, Yellow, which are physical quantities perceived by the eye. A masking UCR ("Under Color Removal" unit 15 performs color correction and separates gray elements from the three CMY signals. (This process is called "under color removal". Black (represented by "K" is then added to. the CMY signals having passed through the UCR process, and these signals are then passed to a gamma (γ) correcting unit 16.

At the gamma correction unit 16, linear correction is performed on the CMYK signals, and these linear corrected signals are then passed to a space filter 17 where edge sharpening, noise reduction and the like are performed. Next, these signals are passed to a printer engine 18. At the printer engine 18, the CMYK signals are printed out onto a recording sheet (or sheets using laser, electro-photography, ink-jet, or similar type of printing process.

The masking unit 13 is connected to an R signal histogram generating unit 19, a G signal histogram generating unit 20, a B signal histogram generating unit 21, and an R' G' B'/Y conversion unit 22. Each of the histogram generating units 19, 20, 21 includes a buffer counter.

Figure 2A:
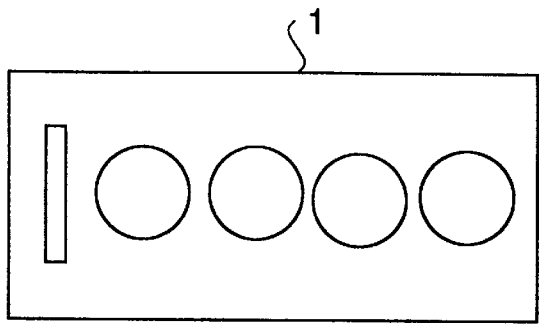
FIG. 2A illustrates a document to be copied.
Figure 2B:
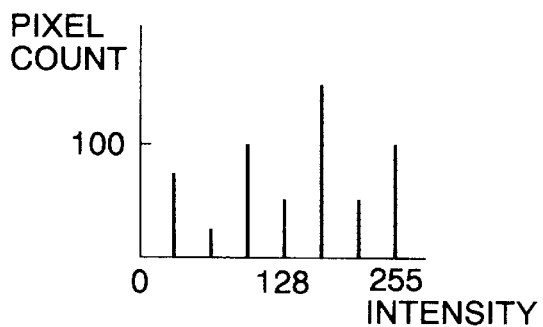
FIG. 2B illustrates a red signal histogram.
Figure 2C:
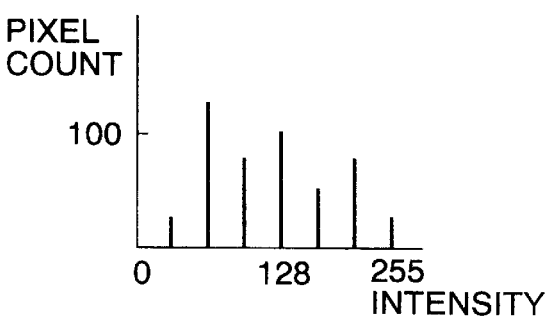
FIG. 2C illustrates a blue signal histogram.
Figure 2D:
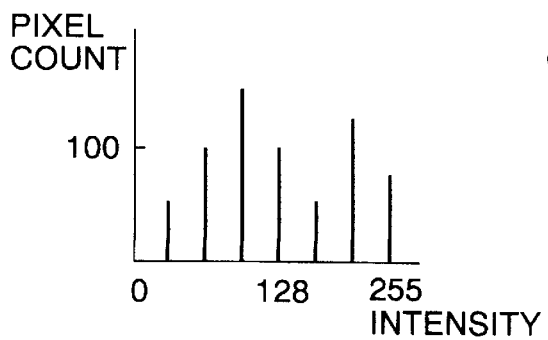
FIG. 2D illustrates a green signal histogram.

The R signal histogram generating unit 19 may generate a histogram such as that shown in FIG. 2B. The horizontal axis of this histogram indicates the digital values of the intensity of the A/D converted R signals. The R signals are output from the color CCD sensor. The vertical axis is the pixel value or count indicating the number (frequency of corresponding digital signals. Similarly, the G signal histogram generating unit 20 generates a G signal histogram as shown in FIG. 2C, and the B signal histogram generating unit 21 generates a B signal histogram as shown in FIG. 2D. The histograms generated by the histogram generating units 19, 20, 21 are all passed to a copy-prohibited determining unit 24.

The copy-prohibited determination unit 24 includes a storage unit 24a, an area (size calculating unit 24b, and a comparison unit 24c. The storage unit 24a stores the R, G, and B signal histograms of various copy-prohibited items such as paper currency and stock certificates together with their sizes. The area calculation unit 24 calculates the area of a scanned document using a histogram, such as that shown in FIG. 2C, generated by the Y signal histogram generating unit 23, which will be described below. When the copy-prohibited determining unit 24 determines that copying of a scanned document should be prohibited, it outputs an alpha (a signal. Otherwise, this determination unit 24 does not generate an alpha signal.

A control unit 25, which controls the color image processing apparatus, outputs a beta (β) signal indicating whether or not the printer engine 18 should print out the scanned document. The beta signal is output based on the output of the copy-prohibited determining unit 24.

In the meantime, the R', G', and B' signals that have been color-corrected by the masking unit 13 are sent to the R'G'B'/Y conversion unit 22. At the R'G'B'/Y conversion unit 22, the R' G' B' signals are converted to a Y signal in the XYZ colormetric reference system using Formula 1.

$$Y = aR' + bG' + cB' \quad (1)$$

The a, b, and c parameters are the experimental values obtained from the color CCD, light source, or the like.

The Y signal derived using Formula 1 is a value that indicates the brightness of the color. The Y signal is sent to the histogram generating unit 23. The histogram generating unit 23 includes a histogram buffer counter, and generates a histogram by counting the frequency of each level of brightness in the Y signal. The resulting histogram may be the one shown in FIG. 2E.

Figure 2E:
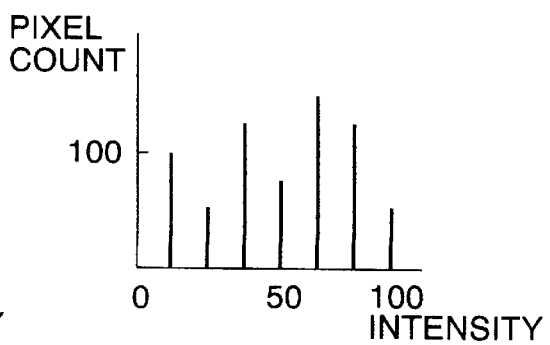
FIG. 2E illustrates a Y signal histogram.

The vertical axis of the histogram in FIG. 2E indicates the pixel count (the number of pixels indicating the brightness of the Y signal and the horizontal axis indicates the intensity of the Y signal. The XYZ data is described in the XYZ color space (CIE (International Comparison on Illumination standard 1931 colormetric reference system wherein a Y value of 100 corresponds to absolute standard white. In other words, the Y value changes between 0 and 100. The histogram that is generated is then sent to the copy-prohibited determining unit 24, and then the area calculating unit 24b calculates the area of the document using Formula 2.

$$\text{Document Area} = (\text{the No. of pixels}) \times (\text{the area per pixel}) \quad (2)$$

For example, if the scanning resolution is 8 dpmm (dots per millimeter in the main scanning direction, and 7.7 lpmm (lines per millimeter in the sub-scanning direction, then the scanning resolution per pixel is $1/61.6$ mm$^2$.

At step S1, the user loads a document 1 for copying (FIG. 2A) into the scanning unit (not shown. Next, at step S2, the user presses a copy key on the control panel of the device (not shown to initiate scanning of the document 1. At step S3, the device determines whether or not scanning of the document 1 has been completed.

At step S4, the R signal, G signal, and B signal histogram generating units 19, 20, and 21 each generate a respective histogram like the ones shown in FIGS. 2B, 2C, and 2D, respectively, based on the R', G' and B' signals which have been color corrected by the masking unit 13. The generated histograms are then sent to the copy-prohibited determining unit 24.

At step S5, the R' G' B' signals output from the masking unit 13 are sent to the R' G' B'/Y conversion unit 22, where the R' G' B'signals are converted to a Y signal in the XYZ colormetric reference system. At step S6, the Y signal histogram generating unit 23 generates a histogram like that shown in FIG. 2E. The value of the Y signal on the horizontal axis of the histogram in FIG. 2E varies between 0 and 100. The Y signal histogram that is thus generated then sent to the copy-prohibited determining unit 24.

At step S7, the area of the document 1 being copied is calculated by the area calculation unit 24c of the copy-prohibited determining unit 24 based on the Y signal histogram (FIG. 2E) using Formula 2.

At step S8, the copy-prohibited determining unit 24 determines whether the area of the document 1 (FIG. 2A) calculated in step S7 matches any of the areas of the copy-prohibited materials which are pre-stored in the memory 24a. If they match, then the program proceeds to step S9, but if they do not match, the program proceeds to step S13.

Figure 3:
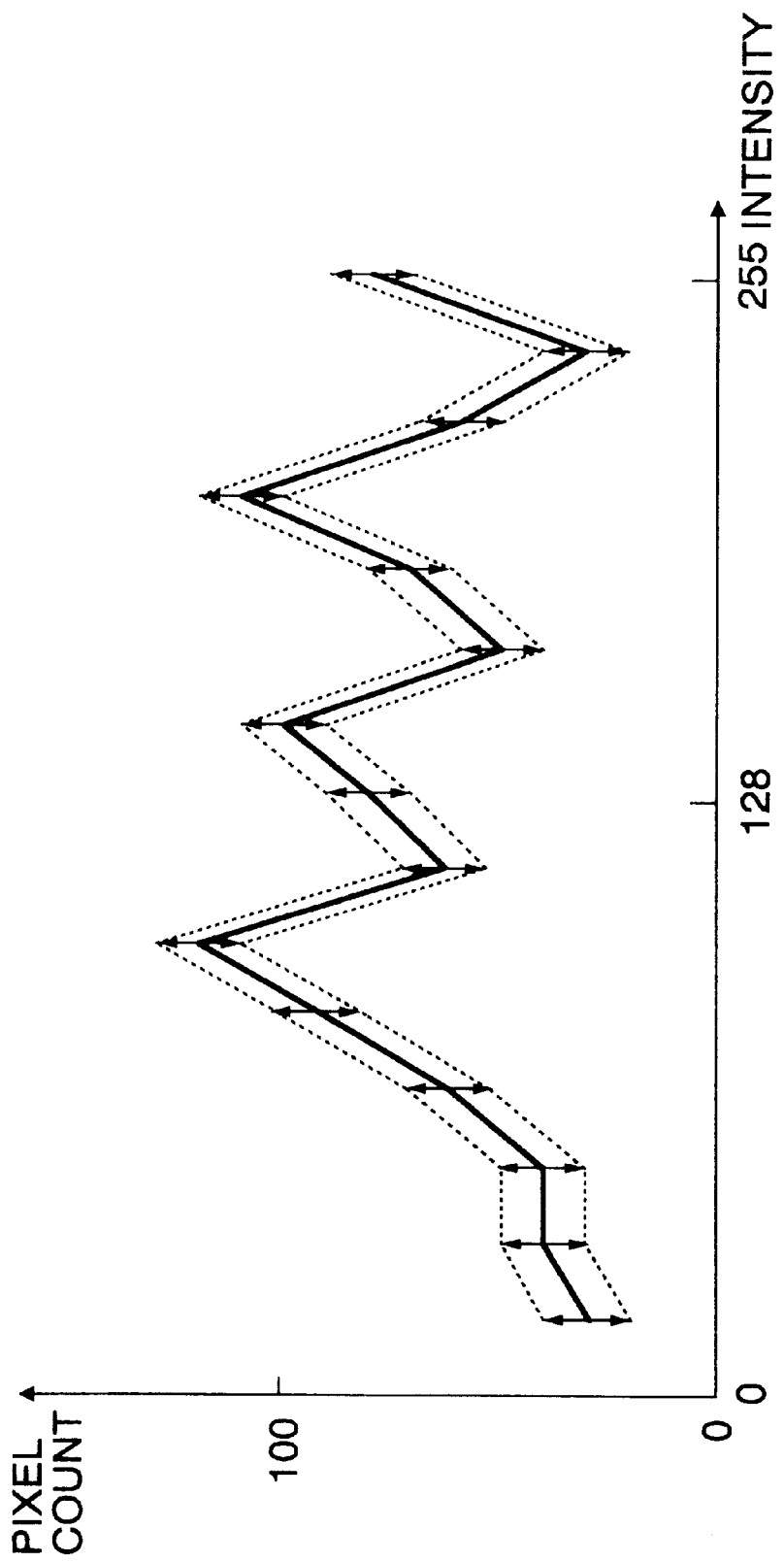
FIG. 3 is an example of a red signal histogram pre-stored in the image processing device of the present invention.

At step S9, the comparing unit 24c compares the R histogram generated by the R signal histogram generating unit 19 with the R histogram of the copy-prohibited image pre-stored in the memory unit 24a. FIG. 3 shows an example of the R signal histogram that is pre-stored into the memory unit 24a. This histogram has a predetermined range of variation as indicated by the dotted lines and arrows. If the R histogram of the document 1 falls within the range of the copy-prohibited R histogram, then the comparison unit 24c determines that the two histograms match, and the program proceeds to step S10. If, on the other hand, the histograms are not judged to match, the program proceeds to step S13.

At step S10, in the same manner as in step S9, the comparing unit 24c compares the G histogram generated by the G signal histogram generating unit 20 with the G histogram of the copy-prohibited image pre-stored in the memory unit 24a, such as that shown in FIG. 3. If the histograms match, the program proceeds to step S11, and if they do not, the program proceeds to step S13.

At step S11, again in the same manner as in step S9, the comparing unit 24c compares the B histogram generated by the B signal histogram generating unit 21 with the B histogram of the copy-prohibited image pre-stored in the memory unit 24a, such as that shown in FIG. 3. If the histograms are judged to match, the program proceeds to step S12, and if they do not, the program proceeds to step S13.

At step S12, since the size and RGB signal histograms of the document 1 being copied and those of the copy-prohibited document match, it is determined that copying should be prohibited, and a copy-prohibiting procedure is performed. In other words, the copy-prohibited determining unit 24 outputs an alpha signal to the control unit 25. When the control unit 25 receives the alpha signal, it outputs a print-disabling signal beta to the printer engine 18.

At step S13, since any one of the area, the R histogram, G histogram and B histogram of the document 1 does not match the copy-prohibited document, it is determined that the document 1 is not a copy-prohibited document, and the copying operation is initiated.

Figure 4:
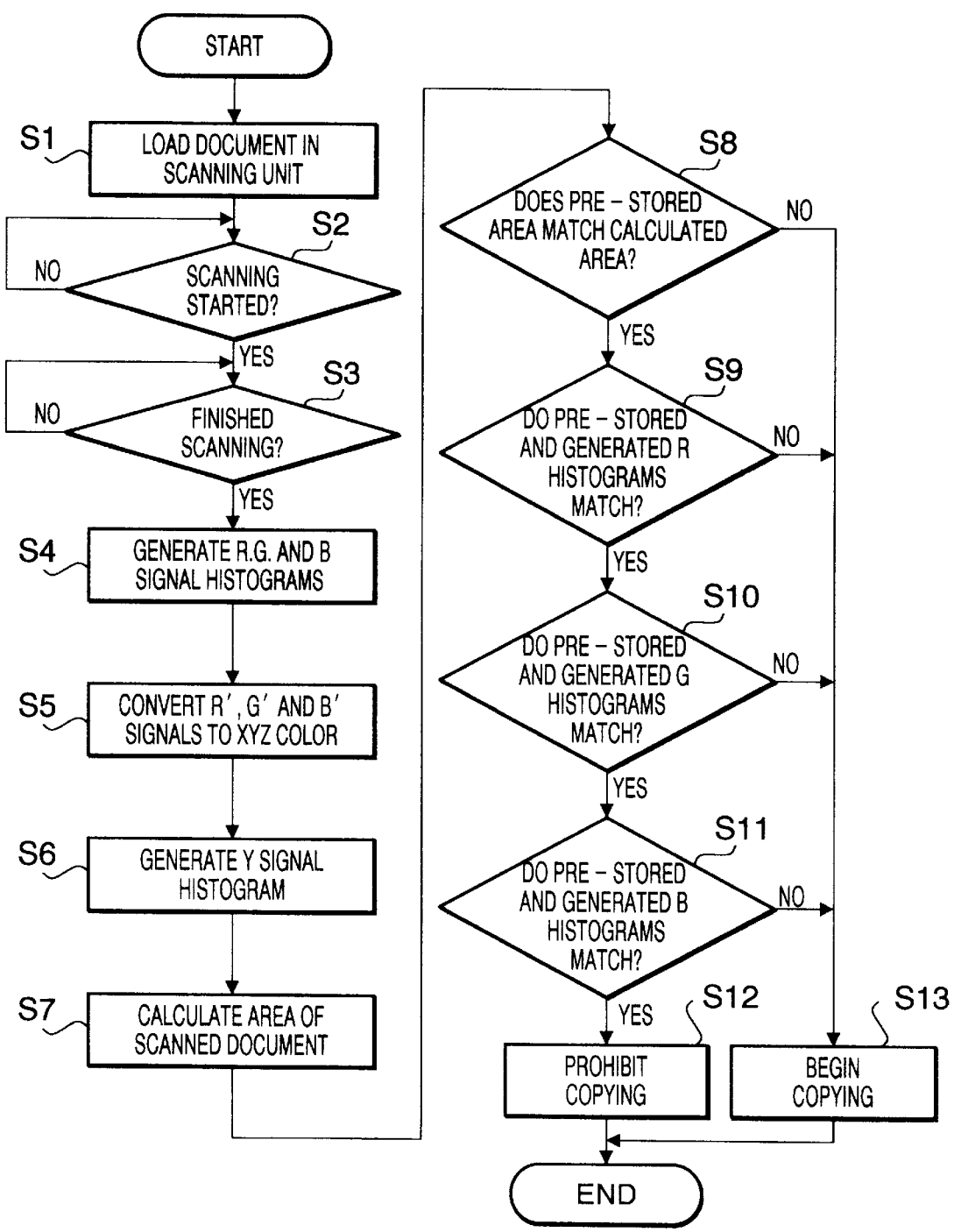
FIG. 4 is a flow chart showing one example of the process executed by the image processing device of the invention when determining prohibition against copying.

In the above described embodiment, when the area and RGB signal histograms of the document being copied match those of the copy-prohibited document, copying of that document is prohibited, but it is also possible to prohibit copying when any one or more of the RGB or area criteria match. For instance, all or any one of steps S9 to S 11 may be omitted from the flow chart shown in FIG. 4.

The above described and illustrated image processing apparatus and image processing method are disclosed in Japanese Patent Application No. 10-299229 filed in JPO on Oct. 21, 1998, and the subject application claims the priority of this Japanese Patent Application, the entire disclosure of which is incorporated herein by reference.

What is claimed is:

1. An image processing apparatus comprising:
    a scanning unit for scanning-in an image of a document;
    a histogram generating unit for generating histograms of signals from the document image scanned-in by the scanning unit; and
    a copy-prohibited determining unit for determining whether or not to prohibit copying of the document based on at least one of the histograms.

2. The image processing apparatus of claim 1, wherein the copy-prohibited determining unit includes:
    a storage unit for pre-storing RGB signal histograms of each of images of copy-prohibited materials together with their respective sizes;
    a size calculating unit for calculating a size of the scanned-in document image based on the histograms generated by the histogram generating unit; and
    a comparing unit for comparing the RGB signal histograms stored in the storage unit with the histograms generated by the histogram generating unit, and comparing the sizes stored in the storage unit with the size calculated by the size calculating unit.

3. The image processing apparatus of claim 2, wherein the copy-prohibited determining unit determines that copying should be prohibited when the histograms generated by the histogram generating unit and the RGB signal histograms of any of the copy-prohibited materials pre-stored in the storage unit match, and the size calculated by the size calculating unit and the size of that copy-prohibited material pre-stored in the storage unit match.

4. The image processing apparatus of claim 2, wherein the copy-prohibited materials include paper currency, stock certificates, bearer bonds, and other monetary instruments.

5. An image processing apparatus comprising:
    scanning means for scanning-in an image of a document;
    histogram generating means for generating histograms of at least two color components of the image scanned-in by the scanning means;
    copy-prohibited determining means for determining whether or not to prohibit copying of the document based on the histograms; and
    image forming means for printing the scanned-in image of the document on a recording sheet, wherein the image forming means does or does not print the scanned-in image of the document based on determination made by the copy-prohibited determining means.

6. The image processing apparatus of claim 5, wherein the histogram generating means generates three histograms for R, G, and B color components of the scanned-in image and the copy-prohibited determining unit determines whether or not to prohibit copying based upon the three histograms.

7. The image processing apparatus of claim 5, wherein the copy-prohibited determining means includes:
    storage means for pre-storing histograms of color components of each of copy-prohibited materials along with their respective sizes;
    size calculating means for calculating a size of the scanned-in document based on the histograms generated by the histogram generating means; and
    comparing means for comparing the histograms pre-stored in the storage means and the histograms generated by the histogram generating means, and the sizes pre-stored in the storage means and the size calculated by the size calculation means.

8. The image processing apparatus of claim 5, wherein the histogram generating means generates histograms for R, G, and B color components of the scanned-in image, the storage means pre-stores histograms for R, G, and B color components of each of the copy-prohibited materials, the size calculating means calculates the size of the scanned-in document based on the R, G, B histograms generated by the histogram generating means, and the comparing means compares the histograms of the R, G, and B color components of the scanned-in document and the histograms of the R, G, and B color components pre-stored in the storage means, respectively.

9. The image processing apparatus of claim 8, wherein the comparing means determines that copying should be prohibited when the size and all the R, G, and B color component histograms of the scanned-in document match those of any one of the copy-prohibited materials pre-stored in the storage means.

10. The image processing apparatus of claim 7, wherein the comparing means determines that copying should be prohibited when the size and histograms of the scanned-in image match the size and histograms of any one of the copy-prohibited materials.

11. The image processing apparatus of claim 7, wherein the copy-prohibited materials include paper currency, stock certificates, bearer bonds, and other monetary instruments.

12. An image processing method comprising the steps of:
    A scanning-in an image of a document;
    B generating histograms of at least two color components of the scanned image;
    C comparing the generated histograms with pre-stored histograms of each of copy-prohibited materials;
    D determining whether or not to prohibit copying based on a histogram comparison result; and
    E prohibiting reproduction of the image of the scanned document when it is determined that copying should be prohibited, while reproducing the image of the scanned document on a sheet when it is determined that copying should not be prohibited.

13. The image processing method of claim 12, wherein histograms for R, G, and B color components are produced in step B, and the histogram comparison of step C is performed for the R, G, and B color components respectively.

14. The image processing method of claim 13, further comprising the steps of:

F calculating the size of the scanned-in document based on the histograms generated in step B; and G comparing the calculated size of the scanned-in document with a size of each of the copy-prohibited materials, wherein step D determines whether or not to prohibit copying based on histogram comparison performed in step C and size comparison performed in step G.

15. The image processing method of claim 12, wherein the copy-prohibited materials include paper currency, stock certificates, bearer bonds, and other monetary instruments.

16. A machine comprising:

a scanner for scanning-in an image of a document;

a memory for storing data about copy-prohibited materials; and a mechanism for prohibiting reproduction of the document when a size of the scanned-in document matches a size of any one of the copy-prohibited materials.

17. The machine of claim 16, wherein the memory stores color histograms of each of the copy-prohibited materials together with their respective sizes, and the mechanism prohibits reproduction of the document when the size and color histograms of the scanned-in document match a size and color histograms of any one of the copy-prohibited materials.

18. The machine of claim 16, wherein the copy-prohibited materials include paper currency, stock certificates, bearer bonds, and other monetary instruments.

* * * * *